No. 706,255. Patented Aug. 5, 1902.
J. P. PUTNAM.
APPARATUS FOR PROTECTING SEALS OF SEWER GAS TRAPS.
(Application filed Apr. 9, 1900.)
(No Model.)

WITNESSES:
INVENTOR

UNITED STATES PATENT OFFICE.

JOHN PICKERING PUTNAM, OF BOSTON, MASSACHUSETTS.

APPARATUS FOR PROTECTING SEALS OF SEWER-GAS TRAPS.

SPECIFICATION forming part of Letters Patent No. 706,255, dated August 5, 1902.

Application filed April 9, 1900. Serial No. 12,149. (No model.)

*To all whom it may concern:*

Be it known that I, JOHN PICKERING PUTNAM, of Boston, in the county of Suffolk and State of Massachusetts, have invented certain new and useful Improvements in Apparatus for Protecting the Seals of Sewer-Gas Traps, of which the following is a specification.

The object of my invention is to provide an apparatus for protecting the water seal of simple round pipe or siphon-formed sewer-gas traps from being destroyed by siphonage, back pressure, or other cause occurring in the ordinary use of plumbing-work; and the method I have devised for this is to place between the traps to be protected a shallow horizontal reservoir-chamber of special design, hereinafter to be described, and to construct one of the said traps of shallow seal and the other traps of deep seal, the traps to discharge into a branch waste-pipe common to all of them, which in its turn discharges into the main soil or drain pipe, the waste from the shallow-seal trap passing through the reservoir-chamber before entering the common waste-pipe, but that of the deep-seal traps entering the waste-pipe direct without passing through said chamber.

Figure 1:
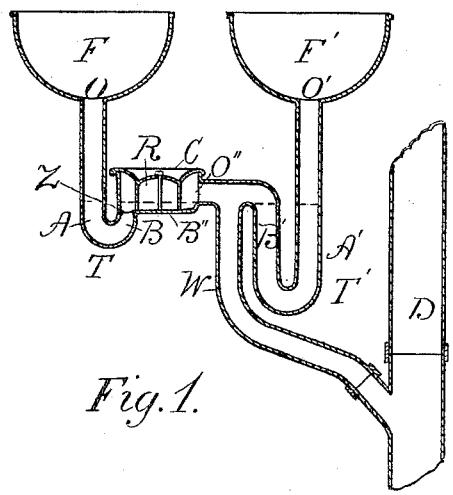
Figure 2:
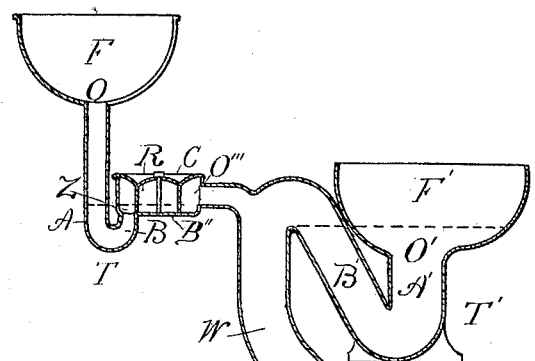
Figure 3:
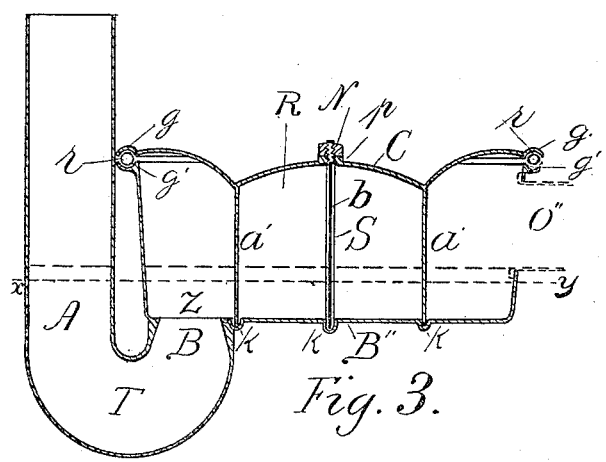
Figure 4:
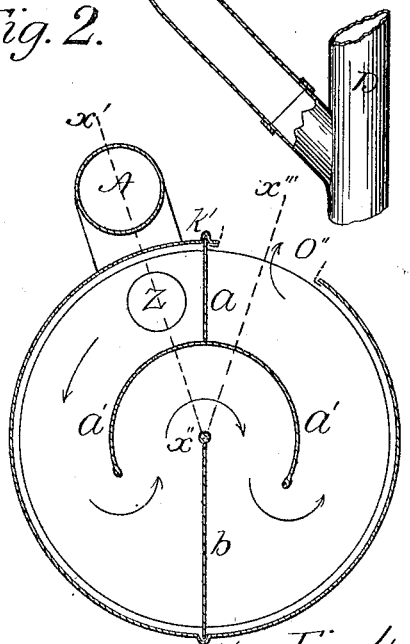
Figure 5:
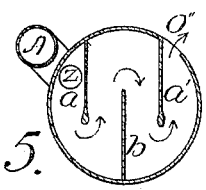
Figure 6:
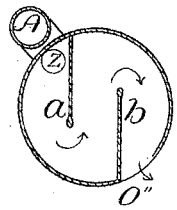

In the drawings, Figure 1 shows in section the manner in which two ordinary siphon-shaped basin-traps are arranged and connected up with the reservoir-chamber to form my apparatus complete. Fig. 2 is a similar section, differing only in that the deep-seal trap is larger than in Fig. 1 and serves a water-closet instead of a washbasin. Fig. 3 is an enlarged section of the reservoir-chamber and of the shallow trap. Fig. 4 is a plan of the same drawn to the same scale as Fig. 3; and Figs. 5 and 6 are plans of the reservoir-chamber, drawn to a smaller scale and showing different arrangement of details. The sections Figs. 1, 2, and 3 are taken along the dotted line $x'\ x''\ x'''$ of Fig. 4.

Similar letters refer to similar parts throughout the views.

F and F' are two plumbing-fixtures. O and O' are the discharge-outlets of the same, respectively.

T and T' are a shallow and a deep trap serving the fixtures F and F', respectively.

R is a reservoir-chamber between the two traps, and W is the branch waste-pipe connecting the traps with the main soil-pipe or drain-pipe D.

The reservoir-chamber is circular in plan, and consists in a main body having a flat horizontal bottom B" and a removable cover C. The cover is provided with a groove $g$ around its outer edge and the body with a corresponding groove $g'$, and between the two grooves is a soft packing-ring $r$. In the center of the reservoir-chamber is a standard S, securely fastened to the bottom of the chamber and threaded at its upper end. The standard is a little longer than the depth of the chamber and extends upward through a hole in the cover made just large enough to admit it. A nut N, threaded to correspond, serves to force the grooved cover down upon the packing-ring $r$ in the groove $g'$ of the reservoir-chamber, making a water-tight joint. The soft packing $p$ under the nut N is made to fit closely around the standard S, so that when the nut is screwed down the pressure exerted by it forces the packing into close contact with the standard, and thereby makes at this point also a water-tight connection.

$a\ a'\ b$ are plates secured to the cover C, which form when the cover is in place partitions in the chamber dividing it into a number of parts substantially equal in width and connected together, so as to form a continuous waterway through the chamber. In Fig. 4 plate $a$ extends from the outer wall of the chamber to plate $a'$. Plate $a'$ is semicircular in shape, concentric with the standard S, and equidistant between the standard and the outer wall. Plate $b$ extends from the standard S to the outer wall in the same plane with plate $a$. These plates are secured to the cover C and are removable with the cover. In order, however, to make a tight connection with the body of the chamber, sinkages $s\ s'$ are provided in the latter at the points where the plates come, and the edges of the plates fit closely into these sinkages.

The traps T and T' are ordinary siphon-traps having the form of a simple round pipe bent in the form of a siphon, one limb of which A A connects with the fixture discharge-pipe and forms the downcast limb of the trap, and the other limb B B' is called the "upcast" limb of the trap. This upcast limb connects in the case of the shallow-seal trap directly with the reservoir-chamber, entering the chamber at its bottom, and at the point of entrance this upcast limb is contracted into a cone-shaped nozzle Z, which has the effect of causing the discharge water from the fixture to pass into the chamber in the form of a jet.

The operation of my apparatus under normal conditions is as follows: When the fixture is discharged, water rushes through the outlet O O' into the downcast limb A A' of the trap. In the case of the shallow-seal trap T it then rushes into the upcast limb B and through the nozzle Z into the reservoir-chamber R. It fills this chamber to the top, passes through it in the direction of the arrows, scouring the sides of the chamber and its partition-walls $a\ a'\ b$, and finally escapes through the outlet O'' O''' into the waste-pipe W. When all the water in the fixture has escaped, the flow ceases and water stands in the trap and reservoir-chamber up to the level of the bottom of the outlet-opening O'' O'''. In the case of the deep-seal trap T' the water from the fixture passes through this trap directly into the waste-pipe W without flowing through the reservoir-chamber, and when all the water from the fixture F' has escaped the water stands in the trap T' up to the level of the top of the upcast limb B'.

Under the abnormal conditions produced by siphonage the action of my apparatus is as follows: A partial vacuum in the waste-pipe W, caused by the falling of a plug of water down the soil-pipe D, causes a suction on the outlet side of the trap, or, more scientifically speaking, a diminution of the normal atmospheric pressure on the outlet side of the trap. Air then presses upon the inlet side of the trap-seal to restore the equilibrium, and this pressure lowers the column of water in the downcast limb A of the trap, throwing an amount of water equivalent to the contents of this downcast limb out of the trap. If the siphonage continues, air then passes through the trap and forces with it a certain quantity of water out of the trap. In the case of the deep-seal trap this water escapes directly into the waste-pipe, and in the case of the shallow-seal trap it passes first through the reservoir-chamber R and thence escapes into the waste-pipe; but since both the shallow and the deep trap are connected with the same waste-pipe W the siphoning influence or partial vacuum affects both traps at the same time and with the same force, and inasmuch as the shallow-seal trap contains but little water this small quantity introduced into the reservoir-chamber raises the level of the water in the chamber but slightly, and this leaves ample room above the level of the water in the chamber to permit of the escape of air from the fixture through the chamber to supply the partial vacuum in the waste-pipe after the water in the shallow trap has been driven out. The inertia of the water in the deep-seal trap being greater than that in the shallow-seal trap in proportion to its greater depth, the deep-seal trap retains a portion of its water, the partial vacuum in the waste-pipe being broken by the supply of air through the shallow-seal trap. As soon as the vacuum is broken air ceases to flow through the shallow-seal trap, and a small quantity of water from the reservoir-chamber flows back into the trap and restores its seal, only slightly lowering the level of the water in the reservoir.

Were the size of the waterway at the point of connection between the shallow trap and the reservoir-chamber as large as the area of the trap in other places, a sudden rush of air caused by a very powerful siphoning action would tend to drive a considerable amount of water out of the reservoir-chamber in front of the large plug of rapidly-moving air thus formed. To avoid this accident, this point of connection is contracted into a jet-nozzle, as shown at Z, the axis of the nozzle pointing upward. This contraction has the effect of causing the air to cut through the water without driving much of the water out in advance of it. It shoots through the water instead of pushing it along in front of it. The comparatively small amount of water that is driven along in front of the jet of air strikes the walls of the circuitous passage-way through the chamber and adhering to these walls returns by gravity into the bottom of the chamber, while the lighter air escapes to break the partial vacuum in the waste-pipes.

When the trap T has been refilled from the reservoir-chamber after the siphoning action has ceased, the water-level in the chamber stands somewhat lower than before—say to the dotted line $x\ y$. Should another partial vacuum then be formed in the waste-pipe system while the water in the chamber stands at this level $x\ y$, the water in the trap will again be forced into the chamber and will be sufficient in amount to restore the level of the water in the chamber to the original overflow-point at the outlet-opening O''; but no more water will escape from the chamber. Air will then follow the water through the trap T and will pass upward in the form of a jet through the nozzle Z and cut through the shallow body of water lying in the chamber, driving some of this water up against the cover of the chamber and against the partitions to which it will adhere and return again by gravity to the chamber-bottom; but no more water will escape from the chamber through the outlet-opening O'', however long the siphoning action be continued.

The sections Figs. 1, 2, and 3 are taken along the line $x'\ x''\ x'''$ of Fig. 4 in order to show both trap A and the outlet-opening O'' of the reservoir-chamber clearly in the same drawing.

Figs. 5 and 6 are diagrams showing other ways in which the partitions $a$ and $b$ may be arranged, the main thing sought being a continuous waterway between the jet Z and the outlet-opening O''.

The cover C of the chamber is circular in form, corresponding with the circular form of the chamber itself. The outer edge or periphery of the cover is higher all around than the interior thereof, so that when water is thrown by the jet Z up from the bottom of the chamber under siphoning action the water, striking the cover, will be deflected away from the periphery of the cover toward the center. It thus tends to prevent the water from escaping at the outlet-opening O'', which is directly under the periphery of the cover. The lowest part of the cover is at the points where the circular partition $a'$ $a'$ joins it. From this point it rises again slightly toward the center, where the standard S passes through it, thus forming a flat dome and giving strength thereto sufficient to enable it to resist the crushing pressure of the nut N.

What I claim as my invention, and desire to secure by Letters Patent, is—

1. The combination of the plumbing-fixtures F F', traps T T' serving the fixtures, chamber R between the traps and the waste-pipe W, the trap T consisting of a shallow U-shaped return-bend, and the trap T' consisting of a deep U-shaped return-bend, and the chamber R consisting of a shallow reservoir between the two traps, the upcast limb of trap T connecting with the chamber at its bottom, and the trap T' connecting with the chamber at one of its sides at a point some distance above its bottom, and the waste-pipe W, which serves both fixtures and their traps, connecting with them at a point between the chamber and the deep-seal trap, substantially as and for the purpose specified.

2. The combination of the plumbing-fixtures F F', traps T and T' serving the same, and waste-pipe W, the trap T having a shallow seal being provided with means for refilling it after siphonage, and the trap T' having a deep seal but without any such means of refilling, the two traps connecting with the same waste-pipe W, substantially as and for the purpose specified.

3. The combination with a U-shaped sewer-gas trap T, of a reservoir-chamber R and a waste-pipe opening O'', the upcast limb B of the trap entering the chamber at its bottom, and the waste-pipe opening being on one side of the chamber a short distance above its bottom, the chamber being provided with a number of partition-walls $a$, $b$, extending from top to bottom of and dividing the chamber into a number of parts and forming a continuous waterway through the chamber, the entrance of the upcast limb of the trap being at one end of the waterway, and the waste-pipe opening O'' being at the other end, substantially as and for the purpose specified.

4. The combination of the trap T, chamber R, waste-outlet opening O'', the chamber being provided with a movable cap C, the cap being bent upward at its outer edge, substantially as and for the purpose specified.

5. The combination of the trap T, reservoir-chamber R, waste-outlet opening O'', the chamber consisting of a main body and a removable cap C, the cap having partitions $a$, $b$, rigidly secured thereto, the partitions descending to the bottom of the chamber, and dividing the chamber into a continuous winding waterway, with means for making a water-tight connection between the body of the chamber and the cap, substantially as and for the purpose specified.

6. The combination of the trap T, reservoir-chamber R, waste-outlet opening O'', the chamber consisting of a main body having a flat bottom B'', provided with grooves K K and a removable cap C, the cap being provided with partitions $a$ $b$ secured thereto, and descending slightly below the bottom B'' of the chamber, into said grooves K, K.

7. The combination of the trap T, reservoir-chamber R, waste-outlet opening O'', standard S, circular partition $a'$ $a'$ concentric with the standard S, partition $b$ extending from the standard to the outer wall of the chamber, and partition $a$ extending from the outer wall of the chamber to the circular partition.

In testimony whereof I have affixed my signature in presence of two witnesses.

JOHN PICKERING PUTNAM.

Witnesses:
THOS. E. HINES,
WILLIAM HUNTER.